9093X
Whiting & Mears.
Cook Stove.
Patented Sept. 9, 1835.
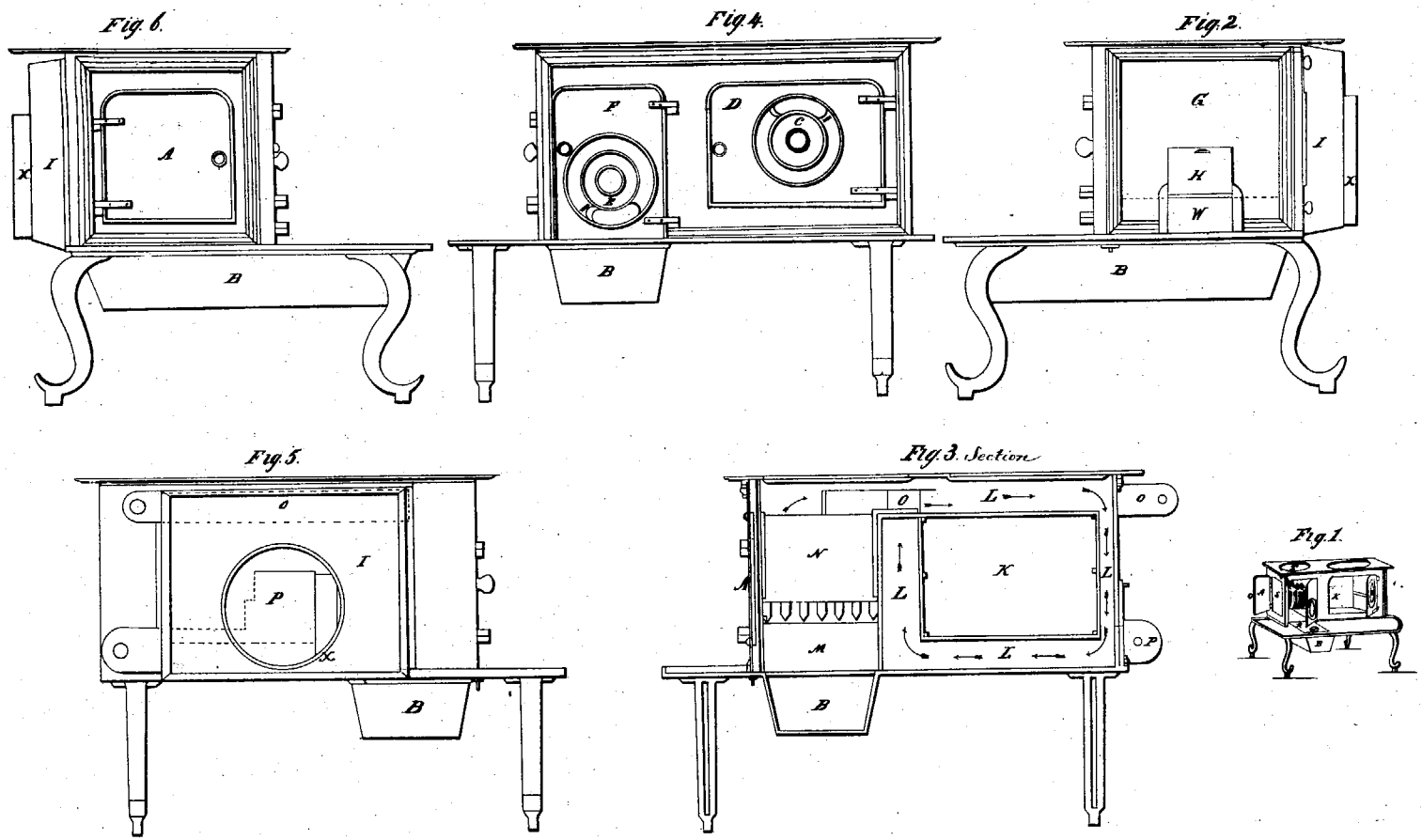

John Whiting & John Mears of Boston Massachusetts

Letters Patent

The schedule referred to in these Letters Patent and making part of the same containing a description in the words of the said John Whiting and John Mears themselves of their improvement in the construction of stoves for cooking To all to whom these presents shall come John Whiting of the City of Boston in the County of Suffolk and Commonwealth of Massachusetts & John Mears of Dorchester in the County of Norfolk in the said Commonwealth Gentlemen send Greeting. Be it known that we the said Whiting and Mears have jointly invented made and applied to use a new and useful improvement in the construction of stoves for cooking to be heated by the burning of either wood or coal or peat which invention and improvement we describe and specify as follows that is to say Figure numbered one, in the drawings hereto annexed as a part of this specification, and description represents a stove constructed upon our improved plan, when put together and figures numbered two, three four, five and six, represent several parts thereof. letter A represents the end door next to the furnace, between this door and the grate where the fire is kindled is a partition of cast iron about three fourths of an inch in thickness part whereof is seen in figure numbered one and is represented by the letter F. This partition is so heated by the fire that when the door A. which is also of cast iron is thrown open, meat of any kind may be roasted and cooked by being brought and kept for a sufficient time near to the said partition. The object of the door is to prevent the heat from being thrown off when it is unnecessary. Letter B. represents the pit into which the ashes falls from the grate and into which by opening the door R which slides horizontally inwards the air may be admitted so as to pass up through the bottom of the grate and ventilate the fire. C represents a revolving register to the oven door which is represented by D. and is of cast iron. The object of the register is to facilitate the es-(cape 9093x of moisture in the operation of roasting and to prevent its escape in baking.
E represents a similar cast iron working register on the cast iron furnace door
which is represented by F. The object of this register is to admit the
air for the purpose of ventilating the fire. Both the sliding door and
the register to the furnace door may be conveniently used together or
separately as may be required; so as to admit the air horizontally or
perpendicularly or in both ways to the fire which must be regulated ac-
cording to the nature of the fuel; and to the circumstances as must be ob-
vious. G. represents the end of the stove opposite to that where the fur-
nace is, and at this end is an aperture represented by W. leading to
the flue on the side of and under the oven, which is opened and closed
by the sliding door H. The object of this aperture is to facilitate the
cleaning of the flues from soot and ashes when required. and the door is
to close the aperture when required so as to prevent the escape of the hot,
or entrance of the cold air, from or to the flues. I. is a box attached to
the stove, into which the hot air and smoke pass from the flues, and
upon which box is the projection X made for receiving the funnel to
carry off the hot air and smoke. K represents the interior of the
oven for baking and roasting. L represents the flues which pass around
the oven; and through which the hot air and smoke pass in the
direction of the arrows from the top of the furnace over the top of the
oven then down by the side of the oven and then under the bottom there-
of and up the other side so as to come in contact with a cast
iron partition by which it is separated from the furnace and thence in-
to the projection I. through an aperture in the back of the stove and
thence off in the funnel. M. represents a space under the grate N. which
is of cast iron and slides readily in and out upon ledges or projections
on the cast iron partitions, which form sides of the furnace. There are three
ledges on each side so that the grate may be fixed higher or lower at plea-
ure as the nature of the fuel and the case may require. O represents a
slide in the back of the stove to open and close an aperture near the top
for the purpose of increasing the drafts of air through the fire when oc-

9093X casion may require. It leads from the top of the furnace immediately into the projection I. P. represents another slide which opens and closes an aperture from the flues into the same projection to regulate the passing off of the hot air and smoke. R is the sliding door before mentioned seen in figure numbered one, for admitting air and removing ashes when required. S is the before mentioned partition beneath the door A. seen in the same figure. T.T. represent apertures, one over the oven, and the other over the furnace for receiving boilers for cooking and through that over the furnace the fuel may be put into the grate, and that over the oven facilitates the clearing of the flues from soot and ashes. Covers adapted to these apertures are to be placed over them when the boilers are not there. We have made our stoves of cast iron entirely excepting rods hinges and such like things, and cast iron is deemed best, but wrought iron may be used. A flat plate of cast iron standing on legs with a sunk hearth or pit from three to four inches deep, and five to six and three quarters inches in width extending nearly across and covered in part by said sliding door R. forms the bottom or foundation of the stove. There are ledges on the sides of the oven to support shelves when required; By the passing of the heated air first over the top then down by the side, and then under the bottom of the oven, a more even and regular heat is communicated to all parts of the oven than by other means now in use, and by allowing it to pass between the oven and furnace, it becomes more rarified and causes a greater draught of the air And we hereby declare that what we claim as new and of our invention is the construction of such stoves as aforesaid, and the several parts thereof not separately, but in combination for the purposes aforesaid, and also the construction of stoves so that the hot air may pass first over then down by the side of and then under the oven and then between the oven and the furnace in manner aforesaid and for the purposes aforesaid. The construction of the oven and furnace may be somewhat varied at discretion, and the side door for roasting may be dispensed with, if thought advisable. but the construction above mentioned is deemed most

9093X convenient in all cases. We do not however intend to confine our last claim
abovementioned to any particular form or construction of the oven or
furnace, excepting only such form as may be necessary to convey the hot
air from the furnace around the oven in the way and manner afore
said for the purposes aforesaid. and We have described the form
which we deem most convenient but it may be somewhat varied
at discretion as is obvious. In testimony that the above is a true speci
fication of our invention we have hereunto set our hands this eighth day
of August in the year of our Lord Eighteen hundred and thirty five Witnesses
Isaac Fish
Geo. W. Warren.

John Whiting
John Alcarz

[illegible]

1391[illegible]

(Patented Sept 9. 1835.)

(Drawing.)